June 6, 1961  J. R. MILES  2,986,972
ULTRAVIOLET COPYING OBJECTIVE LENS
Filed Nov. 13, 1958
FIG.1
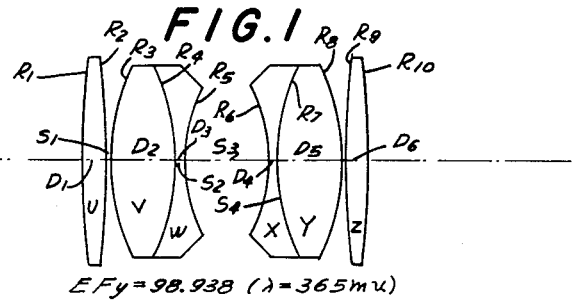
EFy = 98.938 (λ = 365mμ)
FIG.2
| LENS | RAD II | D & S | ND | V |
|---|---|---|---|---|
| | EFD = 100mm | f/5 | FIELD ANGLE = 30° | |
| U | R₁ = +217.02 | D₁ = 2.48 | 1.524 | 59.5 |
| | R₂ = -147.77 | S₁ = .17 | | |
| V | R₃ = +22.92 | D₂ = 7.11 | 1.524 | 59.5 |
| | R₄ = -26.79 | S₂ = 0 | | |
| W | R₄ = -26.79 | D₃ = 1.32 | 1.529 | 51.6 |
| | R₅ = +19.80 | S₃ = 8.93 | | |
| X | R₆ = -19.80 | D₄ = 1.32 | 1.529 | 51.6 |
| | R₇ = +26.79 | S₄ = 0 | | |
| Y | R₇ = +26.79 | D₅ = 7.11 | 1.524 | 59.5 |
| | R₈ = -22.92 | S₅ = .17 | | |
| Z | R₉ = +147.77 | D₆ = 2.48 | 1.524 | 59.5 |
| | R₁₀ = -217.02 | | | |
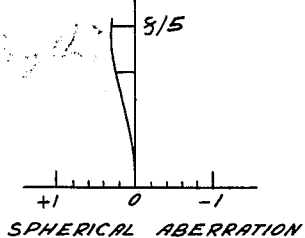
FIG.3
SPHERICAL ABERRATION
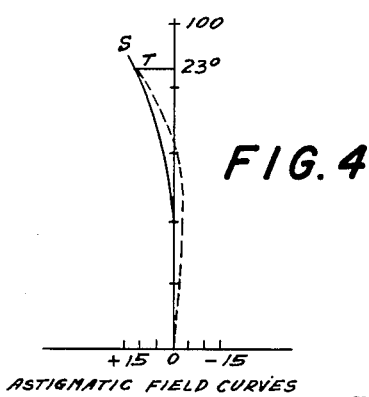
FIG.4
ASTIGMATIC FIELD CURVES
INVENTOR.
JOHN R. MILES
BY
Benjamin Swedler
ATTORNEY

United States Patent Office 2,986,972
Patented June 6, 1961

2,986,972
ULTRAVIOLET COPYING OBJECTIVE LENS
John R. Miles, Glenview, Ill., assignor to Charles Bruning Company, Inc., Mount Prospect, Ill., a corporation of Delaware
Filed Nov. 13, 1958, Ser. No. 773,786
2 Claims. (Cl. 88—57)

This invention relates to symmetrical photographic objectives and lens systems for use at finite conjugates, and, more particularly, to photographic objectives for use in ultraviolet light at finite conjugates.

Optical objectives having four components with two inner thick meniscus components, each constituted of two elements, and two outer double convex components are well known (c.f. Austrian Patent 33,776 of 1907).

Such objectives have been constructed and designed, heretofore, for use in visible light. When heretofore known objectives of this type are used in ultraviolet light, the transmission of ultraviolet light energy is relatively low and the image-quality is relatively poor.

Additionally, optical objectives having a relative aperture of approximately f/5 previously constructed specifically to operate in ultraviolet light, have had relatively poor image-forming quality over a field of 20° or more, because of the choice of refractive material used in, as well as shapes and positions chosen for, the components thereof.

It is an object of the present invention to provide a novel objective lens with a relative aperture between f/4 and f/5 for use in ultraviolet light, which lens results in image quality higher than previously obtainable over a field of approximately 20° or more from the optical axis, and functions particularly well at short conjugate distances, i.e. the distances from the object to the lens, and from the lens to the image.

It is another object of this invention to provide a novel four-component or six element objective lens of higher performance, and high ultraviolet transmission for use in ultraviolet light, which objective lens functions particularly well at short conjugate distances of not over four times the focal length of the objective lens.

It is another object of this invention to provide a novel four-component or six element high performance ultraviolet objective lens, which is constructed of normal optical glass used frequently in objective lenses intended for use in visible light; but the optical glasses are particularly selected in combination for high transmission in ultraviolet light, and are also selected for their optical characteristics for correction of optical aberrations, such as spherical aberration, chromatic aberration, coma, astigmatism and curvature of field.

As a result of extensive research work I have discovered that:

(1) A corrected optical objective of high image quality over a field of 20° from the optical axis and high transmission in ultraviolet light, and with a relative aperture of between f/4 and f/5 can be produced when two thick strongly meniscus doublet lens components are arranged with their concave surfaces facing toward each other, and are associated with two double convex single lens elements exterior to said two meniscus components, and the glass used for all six lens elements thus incorporated has an index of refraction in sodium D light between 1.535 and 1.450;

(2) The aforementioned high optical performance of the ultraviolet objective lens can be obtained when the radii of curvature of all the surfaces of the objective lens are greater than .18f where f is the focal length of the objective lens in sodium D light; and (3) The high optical performance of the ultraviolet objective lens is obtained when the reciprocal dispersion ratio V for all glasses used in the objective is between 49 and 61, where V is equal to $(N_D-1) \div (N_F-N_C)$ where $N_D$ is the index of refraction of each glass in sodium D light, and $N_F$ and $N_C$ are the indices of refraction of each glass in the Fraunhofer F and C light respectively of the solar spectrum.

Objectives, according to the present invention, are very useful in many kinds of copying work where ultraviolet light is used in the region of the spectrum between 3650 A. and 4000 A. wavelength. Ultraviolet light is now used in copying work because printing paper relatively insensitive to visible light can then be used in normal artificial room lighting, without spoiling the paper by exposure to ambient light.

Objectives embodying my invention, have exceptionally high transmission in the region of 3650 A. to 4000 A. The use of the novel shapes, thickness, spaces and arrangement of the lens elements, combined with the selection of glasses herein set forth produces a very high degree of optical correction.

These and other objects and advantages of the invention will be apparent from the details of construction and the form and arrangement of the parts of the objective described hereinafter and shown on the accompanying drawing in which:

FIGURE 1 is a diagrammatic view of a preferred embodiment of my invention;

FIGURE 2 is a table of constructional data relative to this embodiment;

FIGURE 3 is a graph representing the spherical aberration of this embodiment; and FIGURE 4 is a graph representing the astigmatic field curves. In FIGURE 4 the dotted line, marked "T" represents the focal surface for "tangential" rays, and the solid line, marked "S" represents the focal surface for "sagittal" rays.

A photographic or projection objective constructed according to my invention and shown in FIGURE 1, comprises six optically aligned lens elements, in which the construction is substantially symmetrical, with the first lens element like the sixth element, the second element like the fifth lens element, and the third lens element like the fourth lens element. The space between the first lens element and the second lens element is substantially the same as the space between the fifth lens element and the sixth lens element. The second lens element and third lens element may be cemented together, as may the fourth lens element and the fifth lens element. The cementing of the second and third lens elements, as well as the fourth and fifth lens elements, is preferred and advantageous, but it would not depart from this invention if either pair of lens elements, or both pairs of lens elements, were uncemented.

The first lens element is double convex with its first radius of curvature between $+2f$ and $+2.3f$, where $f$ is the focal length of the complete objective. The second radius of curvature of the first lens element is between $-1.3f$ and $-1.6f$. The second lens element is double convex with its first radius of curvature between $+.21f$ and $+.24f$, and its second radius of curvature is between $-.25f$ and $-.28f$. The third element is double concave, and has its first surface substantially numerically equal in radius of curvature to the radius of curvature of the second surface of the second lens element, and the third lens element has its second radius of curvature equal to between $+.18f$ and $+.21f$.

The thicknesses of the first, second and third lens elements are respectively between $.02f$ and $.03f$; between $.065f$ and $.075f$; and between $.01f$ and $.02f$. The space between the first lens element and the second lens element is between zero and $.15f$, and the space between the second and third lens elements is substantially zero.

The space between the third lens element and the fourth lens element is between .08f and .10f.

The glass used in all the lens elements has an index of refraction in sodium D light $N_D$ of between 1.535 and 1.450; such glasses transmit well in ultraviolet light. The index of refraction $N_D$ of the glass in the first, second, fifth and sixth lens elements is between .004 and .010 less than the index of refraction $N_D$ of the glass in the third and fourth lens elements; thus for example if $N_D$ for the third and fourth elements is 1.518 then $N_D$ for the first, second, fifth and sixth elements is between 1.514 and 1.508.

The reciprocal dispersion ratio V of the glass used is greater than 50 for all lens elements, and greater by at least five for the first, second, fifth and sixth lens elements than for the third and fourth lens elements. The reciprocal dispersion of the glass in all six elements is within the range of between 50 and 72 preferably between 49 and 61.

Constructional data for manufacturing one typical objective lens according to the above specified conditions is given here below, wherein $R_1$ to $R_{10}$ inclusive represent the radii of the refractive lens surfaces, numbered from the front to the rear respectively; $D_1$ to $D_6$ inclusive represent the axial thicknesses respectively of the lens elements; and $S_1$ to $S_5$ inclusive represent the axial spacing respectively of the lens elements from each other; $N_D$ given for each glass used is the refractive index $N_D$ aforementioned, and V given for each glass used is the reciprocal dispersion ratio V aforementioned. EF is the equivalent focal length of the complete objective lens for the D line of the solar spectrum.

[$EF_D$=100 mm.   f/5   Field angle=30°]

| Lens | Radii | D and S | $N_D$ | V |
|---|---|---|---|---|
| U | $R_1$ =+217.02 | $D_1$=2.48 | 1.524 | 59.5 |
|   | $R_2$ =−147.77 | $S_1$= .17 |   |   |
| V | $R_3$ =+ 22.92 | $D_2$=7.11 | 1.524 | 59.5 |
|   | $R_4$ =− 26.79 | $S_2$=0 |   |   |
| W | $R_4$ =− 26.79 | $D_3$=1.32 | 1.529 | 51.6 |
|   | $R_5$ =+ 19.80 | $S_3$=8.93 |   |   |
| X | $R_6$ =− 19.80 | $D_4$=1.32 | 1.529 | 51.6 |
|   | $R_7$ =+ 26.79 | $S_4$=0 |   |   |
| Y | $R_7$ =+ 26.79 | $D_5$=7.11 | 1.524 | 59.5 |
|   | $R_8$ =− 22.92 | $S_5$= .17 |   |   |
| Z | $R_9$ =+147.77 | $D_6$=2.48 | 1.524 | 59.5 |
|   | $R_{10}$=−217.02 |   |   |   |

It will be apparent to those skilled in this art that other forms of photographic and projection objectives may be constructed embodying this invention, and changes may be made in the objectives hereabove described without departing from the spirit of the invention as defined in the claims which follow.

What is claimed is:

1. A substantially symmetrical photographic or projection objective lens for use in ultraviolet light which is corrected for spherical aberration, chromatic aberration, coma, astigmatism, and curvature of field, comprising six lens elements in optical alignment with each other in accordance with the following table, where $R_1$ to $R_{10}$ inclusive are the radii of curvature of the lens surfaces of the said lens elements repectively from front to back of said objective lens, $D_1$ to $D_6$ inclusive are the thicknesses of the said lens elements respectively from the front to the back of said objective lens, $S_1$ to $S_5$ respectively from the front to the back of said objective lens are the spaces between said lens elements, and in which $N_D$ represents the index of refraction in sodium D light for the glasses as indicated for each lens elements, and in which V represents the reciprocal dispersion ratio V for the glasses as indicated for each lens element:

[$EF_D$=100 mm.   f/5   Field angle=30°]

| Lens | Radii | D and S | $N_D$ | V |
|---|---|---|---|---|
| U | $R_1$ =+217.02 | $D_1$=2.48 | 1.524 | 59.5 |
|   | $R_2$ =−147.77 | $S_1$= .17 |   |   |
| V | $R_3$ =+ 22.92 | $D_2$=7.11 | 1.524 | 59.5 |
|   | $R_4$ =− 26.79 | $S_2$=0 |   |   |
| W | $R_4$ =− 26.79 | $D_3$=1.32 | 1.529 | 51.6 |
|   | $R_5$ =+ 19.80 | $S_3$=8.93 |   |   |
| X | $R_6$ =− 19.80 | $D_4$=1.32 | 1.529 | 51.6 |
|   | $R_7$ =+ 26.79 | $S_4$=0 |   |   |
| Y | $R_7$ =+ 26.79 | $D_5$=7.11 | 1.524 | 59.5 |
|   | $R_8$ =− 22.92 | $S_5$= .17 |   |   |
| Z | $R_9$ =+147.77 | $D_6$=2.48 | 1.524 | 59.5 |
|   | $R_{10}$=−217.02 |   |   |   |

2. A substantially symmetrical photographic or projection objective lens for use in ultraviolet light, having a relative aperture between f/4 and f/6, which is corrected for spherical aberration, chromatic aberration, coma, astigmatism and curvature of field, comprising six lens elements in optical alignment with each other, which lens has the index of refraction $N_D$ for the glass in all six lens elements between 1.535 and 1.450, has the reciprocal dispersion ration V for the glass in all six lens elements between 49 and 61, has the first, second, fifth and sixth of said six lens elements double convex and the third and fourth of said lens elements double concave, and in which lens the first surface of said first lens element and the second surface of said sixth lens element have radii of curvature numerically equal to between 2.0f and 2.3f, where f is the focal length of the compelte objective lens, the second surface of said first lens element and the first surface of said sixth lens element have their radii of curvature numeralically equal to between −1.3f and −1.6f, the first surface of said second lens element and the second surface of said fifth lens element having their radii of curvature numerically equal to between .21f and .24f, the second surface of said second lens element and the first surface of said fifth lens element and the first surface of said third lens element and the second surface of said fourth lens element have their radii of curvature numerically eqaul to between −.25f and −.28f, and in which the second surface of said third lens element and the first surface of said fourth lens element have their radii of curvature numerically equal to between .18f and .21f.

References Cited in the file of this patent

UNITED STATES PATENTS

| | | |
|---|---|---|
| 583,336 | Rudolph | May 25, 1897 |
| 1,792,917 | Merte | Feb. 17, 1931 |
| 1,955,850 | Hallett et al. | Apr. 24, 1934 |
| 2,003,881 | Grossett et al. | June 4, 1935 |
| 2,100,290 | Lee | Nov. 23, 1937 |
| 2,117,252 | Lee | May 10, 1938 |
| 2,206,382 | Zimmermann | July 2, 1940 |
| 2,401,324 | Altman | June 4, 1946 |
| 2,406,762 | Grey | Sept. 3, 1946 |
| 2,416,032 | Warmisham et al. | Feb. 18, 1947 |
| 2,455,808 | Reiss | Dec. 7, 1948 |
| 2,601,368 | Cook | June 24, 1952 |
| 2,777,362 | Berger et al. | Jan. 15, 1957 |

FOREIGN PATENTS

| | | |
|---|---|---|
| 33,776 | Austria | July 25, 1908 |
| 321,078 | Great Britain | Oct. 31, 1929 |
| 847,600 | France | Sept. 3, 1939 |